Oct. 4, 1927.
T. C. DELAVAL-CROW
1,643,982
BEARING
Filed July 11, 1924
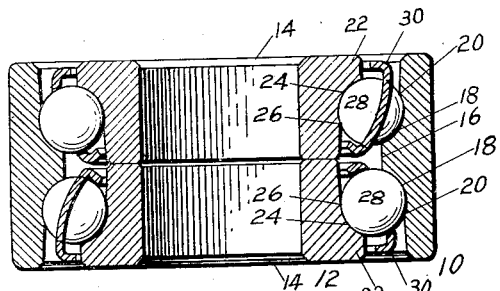
FIG. 1.
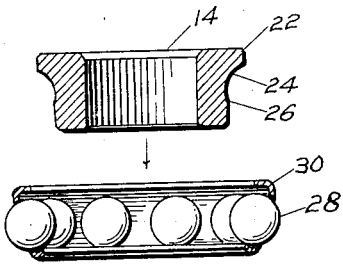
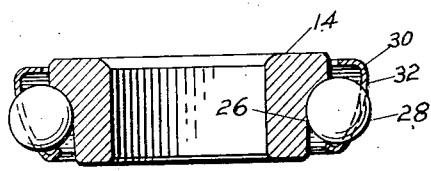
FIG. 3.
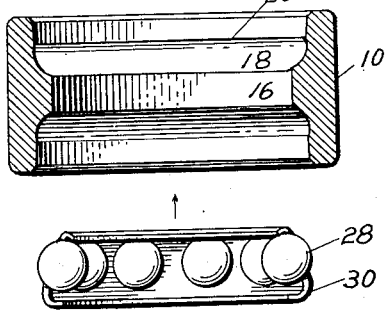
FIG. 2.
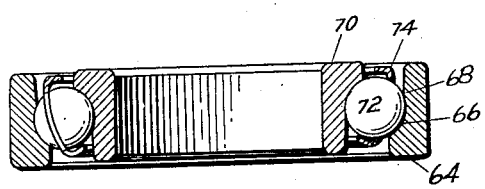
FIG. 4.
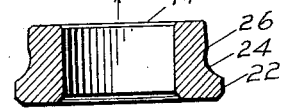
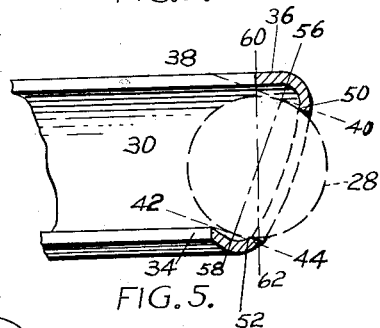
FIG. 5.
FIG. 6.
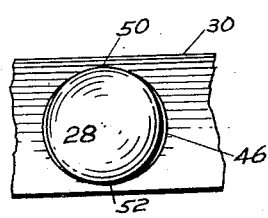
FIG. 7.
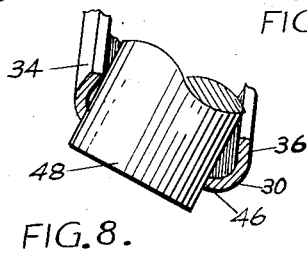
FIG. 8.
INVENTOR:
T. C. DELAVAL-CROW,
BY
HIS ATTORNEY.

Patented Oct. 4, 1927.

1,643,982

UNITED STATES PATENT OFFICE.

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BEARING.

Application filed July 11, 1924. Serial No. 725,508.

This invention relates to bearings and is herein shown as embodied in ball bearings of the angular contact and double-row types with an improved separator therefor.

Double-row ball bearings have been made of a single outer race ring and two inner race rings or cones but, heretofore, such bearings have required some special securing means to hold the various parts together or else they have required special assembling fixtures. Ball separators, heretofore used, have required bending or fastening operations thereon after the balls have been inserted or after the ball openings have been cut, and the assembled balls and separator have not had inherent capacity to stay on the cone.

It is an object of this invention, therefore, to provide a ball bearing which can be assembled with great facility, without the aid of special fixtures. Another object is to provide a ball bearing which will be unit-handling, not only as regards the entire bearing, but as to subsidiary assembled parts, and this without any special fastenings. Another object is to provide an improved separator for such bearings and more especially a one-piece separator which will hold itself and the balls on the cone. Another object is to provide a separator which can be wholly formed and completed before the balls are inserted and one which has inherent capacity to receive and hold the balls while the cone is inserted and thereafter form a unit with the cone. Still another object is to provide a simple, one-piece separator that is light, strong and accurately formed. Yet another object is to provide improved methods of making separators and assembling ball bearing parts.

To these ends and also to improve generally upon devices of the character indicated, my invention consists in the various matters hereinafter described and claimed.

Referring to the drawings, Figure 1 is a sectional view of the improved double-row bearing.

Figure 2 is an exploded view thereof drawn to a smaller scale.

Figure 3 is an enlarged sectional view of a cone assembled with a separator and balls to form a unit-handling self-contained unit.

Figure 4 is an enlarged sectional view of a ball separator.

Figure 5 is a detail sectional view of a portion of the separator still further enlarged.

Figure 6 is a sectional view of an angular contact bearing unit.

Figure 7 is a diagrammatic view of a portion of the separator, the eccentricity of the ball opening being exaggerated.

Figure 8 is a detail view illustrating a step in the method of making the separator.

The numerals 10 and 12 indicate outer and inner race members, one of which is formed of abutting sections 14, 14. In the present instance, the outer race member 10 comprises an integral cup having a central rib 16 with an angular contact raceway 18 on each side thereof, and with a snap rib 20 outside of each raceway. Each rib 20 has its diameter a little smaller than that of the deepest circle of the raceway 18 for a purpose which will later appear. The abutting sections 14, 14 are herein shown as cones, each having a shoulder 22 at the outside with an angular contact raceway 24 inside the shoulder and a snap rib 26 on the other side of the raceway from the shoulder. Each rib 26 has its diameter a little larger than that of the deepest circle of the raceway 24 to retain thereon a circular series of balls 28 with a separator 30.

Each separator 30 comprises a body portion in the form of a flaring ring 32 which is concavo-convex in cross section and has its surface generally inclined at an angle to the axis of the ring, as shown by the tangent line T—T in Figure 4. At the smaller end of the ring 32 a flange 34 is bent or rolled inwardly and extends at approximately right angles to the surface of the flaring part, thereby forming a stiffening member of substantially frusto-conical form. At the larger end of the ring, a stiffening flange 36 is bent or rolled abruptly inwardly, this flange, as shown in Figure 5, terminating a greater distance from the flange 34 than the diameter of the balls 28 so that the balls can be readily placed between said flanges. The distance between line 38, 40 and line 42, 44 indicates the width of space required to insert a ball and this is less than the distance between the flanges. The surface of the ring 32 is substantially parallel to the contact portions of the race-ways 18 and 24 and has a series of ball openings 46 a little smaller than the balls, to retain them against outward escape. The flaring ring 32 is of such a diameter that its ball engaging portions will retain the balls with their cone engaging portions within a circle smaller than the snap rib 26 when the cone and its rib are snapped inside the circle of balls. The separator is elastic to permit a slight stretching during the snapping action and its strong one-piece construction enables it to immediately regain its accurate original form.

As indicated in Figure 4, the radius R of the outwardly bowed cross-sectional portion of the ring 32 is less than the radius S of the ring as a whole. Hence the surface of the flaring portion is nearly spherical but not truly spherical. The flaring ring is pressed between dies into this near-spherical form before the ball openings 46 are punched. The openings are sheared out of the ring by a tool 48 in the form of a cylindrical punch which is reciprocated normal to the surface of the ring 32, thereby forming openings 46 which are slightly elliptical, as shown in Figure 7, with the major axis of the openings extending in the direction of rotation of the ring and the balls. The cylindrical punch is of slightly smaller diameter than the balls so that the rims of the openings 46 can engage the balls at 50 and 52 outside of their axis of rotation but near said axes. This facilitates rotation of the balls in the direction they should travel when in use. The axis of rotation of a ball is indicated approximately by the line 56, 58 in Figure 5 and it is substantially parallel to the flaring surface of the ring 32. Forming the ball openings after the separator has been pressed into shape, insures accuracy and decreases ball and separator friction.

In assembling the bearing parts, the separator 30 is supported in a horizontal plane with the small end downwardly, as indicated in Figures 4 and 5, and the balls are placed in the openings 46 or on the flange 34. It will be noted from Figure 5 that, when a ball is once in its opening, it will maintain its positon by gravity, the center of gravity of each ball lying in a vertical line 60, 62 which falls a little outside of the point 52. Even if the balls are jarred so that they move radially inwardly, they are nevertheless retained by the flange 34 which also aids in holding a circular series of balls preparatory to inserting them in the openings. When the balls are all in the openings, the cone 14 is moved downwardly and the rib 26 snapped inside the circle of balls. Before the rib can pass, the balls are cammed outwardly by the usual tapered surface outside the rib and strike the rims of the openings at 50 and 52, the separator and balls being slightly deformed but immediately regaining their shape when the snap rib has passed. Thus the separator is completely formed before receiving the balls and yet it is inherently capable of receiving and holding the balls while the cone is inserted and of thereafter holding the balls and cone assembled. A unit-handling part, such as shown in Figure 3, is thus produced. This subsidiary unit is then snapped downwardly into the cup 10, the balls 28 being cammed inwardly against the cone by the slight taper on the cup outside the rib 20, then snapping past the rib 20 and thereafter maintaining their position in the raceway 18 due to the inherent elasticity of balls, cone and cup. In other words, when the balls are seated between the raceways 18 and 24, their outermost points always lie in a circle which is a little larger than the rib 20 even if the balls are seated in the deepest circle of the raceway 24. The other cone, separator, and balls are assembled in the same way and inserted in the other side of the cup 10 to make a self-contained, unit-handling, double-row ball bearing. If desired, heat may be utilized to expand the separator or the cup, to facilitate assembly.

In Figure 6, the outer race ring 64 is of the angular contact type with a raceway 66 and a snap rib 68 which receives the assembled unit comprising cone 70, balls 72 and separator 74 in a similar manner.

Although the invention has been described by reference to certain specific constructions and steps it should be understood that the invention, in its broader aspects, is not necessarily limited to the forms selected for illustration.

I claim:

1. A self-contained, unit-handling, double-row ball bearing comprising an outer cup having a central rib with an angular contact raceway on each side thereof, a pair of inner abutting cones, each having a shoulder at the outside and an angular contact raceway inside said shoulder and facing one of the raceways on the cup, a snap rib on each cone inside the raceway and having a diameter slightly larger than that of the deepest circle of said raceway, a circular series of balls for each raceway, a separator for each series having openings smaller than the balls, said separator having its ball engaging portion of a diameter normally to hold the balls in the raceway of the cone and in a circle smaller than the snap rib, and said outer cup also having snap ribs outside the raceways therein, said ribs having a diameter smaller than that of the deepest circle of said raceways and confining the assembled cones, balls and separators within the cup; substantially as described.

2. A self contained, unit-handling, double-row ball bearing comprising inner and outer race members, one of said race members having a central rib with an angular contact raceway at each side thereof, a snap rib outside each raceway, each rib having its diameter differing slightly from that of the deepest circle of said raceways, the other of said race members being formed of abutting sections, each having a shoulder at the outside and an angular contact raceway inside the shoulder, a snap rib on each of said sections inside the raceway and having its diameter differing slightly from that of the deepest circle of said raceway, a circular series of balls for each raceway, a separator for each series having openings smaller than the balls, said separators having their ball engaging portions of a diameter normally to hold the balls in the raceways of one of said race members and in a circle of such diameter that the balls are held against lateral displacement by the snap ribs on said race member, the assembled balls, separators and race member being themselves held in assembled relation to the other race member by the snap ribs on the latter; substantially as described.

3. A self-contained, unit-handling ball bearing comprising an outer cup having a shoulder with an angular contact raceway at one side thereof, an inner cone having a shoulder with an angular contact raceway at one side thereof, the shoulders being arranged on opposite sides of a series of balls, a snap rib on the cone at the opposite side of the raceway from the shoulder, said rib having a diameter slightly larger than that of the deepest circle of the raceway, a separator having a series of openings smaller than the balls and having its ball engaging portions of a size normally to hold the balls in one of the raceways and in a circle of such diameter that the balls are held against lateral displacement by the snap rib, and said other race member also having a snap rib on the opposite side of its raceway from the shoulder, said rib having a diameter differing slightly from that of the deepest circle of the corresponding raceway and confining the assembled balls, separator and first race member in assembled relation to the other race member; substantially as described.

4. In a ball bearing, in combination, a cone having a shoulder with an angular contact raceway at one side thereof, a snap rib, opposite the shoulder, having a diameter larger than that of the deepest circle of the raceway, a series of balls, a separator having a body portion in the form of a ring with a series of ball openings smaller than the balls, the diameter of the ring at the ball openings being of a size normally to hold the balls on the raceway in a circle smaller than that of the snap rib, and an outer cup to receive the assembled balls, separator and cone, said cup having an angular contact raceway opposite the raceway of the cone; substantially as described.

5. In a ball bearing, in combination, a cone having a shoulder with an angular contact raceway at one side thereof, a snap rib, opposite the shoulder, having a diameter larger than that of the deepest circle of the raceway, a series of balls, a separator having a body portion in the form of a flaring ring with a series of ball openings smaller than the balls, a flange extending inwardly from the smaller diameter of the ring to direct the balls into the openings and hold them during assembly, and said separator being elastic and having its ball engaging ring portion of a diameter to hold the balls on the raceway of the cone when the cone is snapped inside the circle of balls; substantially as described.

6. In a ball bearing, a series of balls, a cone having a shoulder at one side with an angular contact raceway thereon, a snap rib on the other side of the raceway from the shoulder, the rib having a diameter slightly larger than the deepest circle of the raceway, in combination with a one-piece separator having a perforated ring portion engaging the balls outside their axes of rotation and normally confining them in a circle smaller than that of the snap rib; substantially as described.

7. In a ball bearing, a series of balls, a cone having a shoulder at one side with an angular contact raceway thereon, a snap rib on the other side of the raceway from the shoulder, the rib having a diameter slightly larger than that of deepest circle of the raceway, in combination with a one-piece separator having a ring portion with openings smaller than the balls and engaging the balls slightly outside their axes of rotation, said separator having its ball engaging ring portion of a diameter to hold the balls in a circle smaller than the snap rib and the separator being elastic to allow the balls to be forced over said rib; substantially as described.

8. In a ball bearing, a separator for a series of balls comprising a body portion in the form of a ring gently bowed outwardly in cross-section, the surface of the ring being inclined at an angle to the axis of the ring and said ring having a series of ball openings slightly smaller than the balls, a flange at the smaller end of the ring bent inwardly towards the axis of the ring at a distinct angle to the body portion and forming a stiffening or holding flange aiding in directing the balls into the openings during assembly, and a second flange bent abruptly inwardly from the body portion at the larger end of the ring; substantially as described.

9. In a ball bearing, a separator for a series of balls comprising a body portion in the form of a ring gently bowed outwardly in cross-section, the surface of the ring being inclined at an angle to the axis of the ring and said ring having a series of ball openings smaller than the balls, and flanges bent abruptly inwardly at the ends of the body portion and having their inner terminals spaced apart a distance greater than the ball diameters to freely admit the balls to the openings; substantially as described.

10. In a ball bearing, a separator for a series of balls comprising a body portion in the form of a flaring ring bowed outwardly in cross section with a cross sectional radius of curvature slightly less than the radius of the ring to form a near spherical surface, said ring having elliptical ball openings formed therein with their major axes extending in the direction of rotation of the ring, and the rims of the openings engaging the balls wholly outside their axes of rotation to hold the balls against outward escape and allow free inward removal; substantially as described.

11. The method of making a ball separator which consists in forming a flaring ring concavo-convex in cross section with the cross sectional radius of curvature less than the radius of the ring, thereby producing a near spherical surface, and reciprocating a cylindrical tool, of a diameter smaller than that of the balls, normal to said surface to shear out slightly elliptical ball openings having their major axes extending in the direction of rotation of the ring; substantially as described.

12. The method of assembling the cone, separator, balls and cup of a ball bearing which consists in supporting the separator in a substantially horizontal plane, resting the balls in openings of the separator, snapping the cone downwardly inside the circle of balls, and then snapping the assembled unit-handling cone, separator and balls inside the cup to hold all the parts together; substantially as described.

In testimony whereof I hereunto affix my signature.

THOMAS C. DELAVAL-CROW.